United States Patent
O'Connor et al.

(10) Patent No.: US 11,131,256 B2
(45) Date of Patent: Sep. 28, 2021

(54) FUEL OXYGEN CONVERSION UNIT WITH A FUEL/GAS SEPARATOR

(71) Applicant: General Electric Company, Schenectady, NY (US)

(72) Inventors: Ethan Patrick O'Connor, Hamilton, OH (US); Daniel Alan Niergarth, Norwood, OH (US); Brandon Wayne Miller, Liberty Township, OH (US); Richard Alan Wesling, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 188 days.

(21) Appl. No.: 16/178,898

(22) Filed: Nov. 2, 2018

(65) Prior Publication Data

US 2020/0141337 A1    May 7, 2020

(51) Int. Cl.
  *B01D 47/00*   (2006.01)
  *F02D 21/08*   (2006.01)
  (Continued)

(52) U.S. Cl.
  CPC ......... *F02D 21/08* (2013.01); *B01D 19/0057* (2013.01); *B01D 45/12* (2013.01);
  (Continued)

(58) Field of Classification Search
  CPC .... F02D 21/08; F02D 21/04; F02D 2021/083; F02D 2200/08; F02B 47/10;
  (Continued)

(56) References Cited

U.S. PATENT DOCUMENTS

| 2,582,842 A | 1/1952 | Messinger |
| 2,720,313 A | 10/1955 | Pattison |

(Continued)

FOREIGN PATENT DOCUMENTS

| EP | 2003311 A2 | 12/2008 |
| EP | 3018304 A1 | 5/2016 |

(Continued)

OTHER PUBLICATIONS

U.S. Appl. No. 15/819,327, filed Nov. 28, 2017.
(Continued)

*Primary Examiner* — Dung H Bui
(74) *Attorney, Agent, or Firm* — Dority & Manning, P.A.

(57) ABSTRACT

A fuel oxygen conversion unit includes a contactor defining a liquid fuel inlet, a stripping gas inlet and a fuel/gas mixture outlet. The fuel oxygen conversion unit also includes a fuel/gas separator defining a fuel/gas mixture inlet in flow communication with the fuel/gas mixture outlet of the contactor, an axial direction, and a radial direction. The fuel/gas separator includes a separator assembly including a core including a gas-permeable section extending along the axial direction and defining a maximum diameter, the maximum diameter of the gas-permeable section being substantially constant along the axial direction; and a stationary casing, the fuel/gas separator defining a fuel/gas chamber in fluid communication with the fuel/gas mixture inlet at a location inward of the stationary casing and outward of the gas-permeable section of the separator assembly along the radial direction.

18 Claims, 7 Drawing Sheets

(51) Int. Cl.
| | |
|---|---|
| *F02D 21/04* | (2006.01) |
| *F02B 47/10* | (2006.01) |
| *B01D 19/00* | (2006.01) |
| *B01D 45/12* | (2006.01) |
| *F02C 7/224* | (2006.01) |
| *B01D 3/38* | (2006.01) |
| *B04B 5/12* | (2006.01) |
| *F01M 13/04* | (2006.01) |
| *F02C 3/20* | (2006.01) |
| *F02C 3/24* | (2006.01) |

(52) U.S. Cl.
CPC .............. *F02B 47/10* (2013.01); *F02D 21/04* (2013.01); *B01D 3/38* (2013.01); *B01D 2256/12* (2013.01); *B04B 2005/125* (2013.01); *F01M 13/04* (2013.01); *F01M 2013/0422* (2013.01); *F02C 3/20* (2013.01); *F02C 3/24* (2013.01); *F02C 7/224* (2013.01); *F02D 2021/083* (2013.01); *F02D 2200/08* (2013.01); *Y02T 50/60* (2013.01)

(58) Field of Classification Search
CPC .. B01D 19/0057; B01D 2256/12; B01D 3/38; Y02T 50/60; F02C 7/224; F02C 3/20; F02C 3/24; F02C 7/22
See application file for complete search history.

(56) References Cited

U.S. PATENT DOCUMENTS

| | | |
|---|---|---|
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinbeny |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1 | 10/2011 | Limaye et al. |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |

(56) References Cited

U.S. PATENT DOCUMENTS

| | | |
|---|---|---|
| 2016/0305440 A1* | 10/2016 | Laboda .............. B01D 45/14 |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2020/0086239 A1 | 3/2020 | Cordatos et al. |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

OTHER PUBLICATIONS

U.S. Appl. No. 15/819,443, filed Nov. 21, 2017.

Landfill, Sewage, Biogas, Coal, Seam & Mines Gas Sepamtion/Filtration, Kelburn Engineering—LandfillGas and Air Separation, 3 pages. www.kelburneng.com.uk//landfill-gas-bio-gas-sewer-gas.php.

* cited by examiner

FIG. 9

FUEL OXYGEN CONVERSION UNIT WITH A FUEL/GAS SEPARATOR

FIELD

The present subject matter relates generally to a fuel oxygen conversion unit for an engine, and more particularly to a fuel oxygen conversion unit with a fuel/gas separator.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose.

Certain fuel oxygen conversion systems mix fuel with a relatively low oxygen content stripping gas. However, the inventors of the present disclosure have found that a substantially high amount of the stripping gas must be removed from the fuel after mixing to limit undesirable results, such as combustion dynamics. Accordingly, a fuel oxygen conversion unit with a fuel/gas separator capable of removing a desired amount of stripping gas would be useful.

BRIEF DESCRIPTION

Aspects and advantages of the invention will be set forth in part in the following description, or may be obvious from the description, or may be learned through practice of the invention.

In one exemplary embodiment of the present disclosure, a fuel oxygen conversion unit is provided. The fuel oxygen conversion unit includes a contactor defining a liquid fuel inlet, a stripping gas inlet and a fuel/gas mixture outlet. The fuel oxygen conversion unit also includes a fuel/gas separator defining a fuel/gas mixture inlet in flow communication with the fuel/gas mixture outlet of the contactor, an axial direction, and a radial direction. The fuel/gas separator includes a separator assembly including a core including a gas-permeable section extending along the axial direction and defining a maximum diameter, the maximum diameter of the gas-permeable section being substantially constant along the axial direction. The fuel/gas separator further includes a stationary casing, the fuel/gas separator defining a fuel/gas chamber in fluid communication with the fuel/gas mixture inlet at a location inward of the stationary casing and outward of the gas-permeable section of the separator assembly along the radial direction.

In certain exemplary embodiments the gas-permeable section defines a volume fraction, and wherein the volume fraction is greater than 20 percent and less than 75 percent.

In certain exemplary embodiments the gas-permeable section defines a volume fraction that varies along the axial direction.

For example, in certain exemplary embodiments the fuel/gas separator defines a first end and a second end along the axial direction, wherein the fuel/gas mixture inlet is positioned at the first end, and wherein the volume fraction of the gas-permeable section decreases towards the second end of the fuel/gas separator.

In certain exemplary embodiments the gas-permeable section of the core defines a plurality of labyrinth gas flow paths.

For example, in certain exemplary embodiments the gas-permeable section of the core is formed through an additive manufacturing process.

In certain exemplary embodiments the fuel/gas separator defines a first end and a second end along the axial direction, wherein the fuel/gas mixture inlet is positioned at the first end, wherein the core further includes a gas-impermeable section extending along the axial direction, wherein the gas-impermeable section is positioned adjacent to the gas-permeable section along the axial direction and closer to the first end of the fuel/gas separator than the gas-permeable section.

In certain exemplary embodiments the gas-permeable section of the core defines a substantially cylindrical shape along the axial direction.

In certain exemplary embodiments the fuel/gas mixture inlet is configured to provide substantially all of a fuel/gas mixture received therethrough to the fuel/gas chamber.

In certain exemplary embodiments the separator assembly of fuel/gas separator further includes a plurality of paddles coupled to the core and extending outwardly generally along the radial direction.

For example, in certain exemplary embodiments the plurality of paddles each define a length along the axial direction, wherein the gas-permeable section of the core defines a length along the axial direction, and wherein the length of the gas-permeable section of the core is substantially equal to the length of each of the plurality of paddles.

In certain exemplary embodiments the separator assembly is rotatable about the axial direction of the fuel/gas separator relative to the stationary casing.

In certain exemplary embodiments the fuel/gas separator defines a gas outlet, and wherein the core defines a gas passage extending inward of the gas-permeable section of the core along the axial direction to the gas outlet.

In another exemplary embodiment of the present disclosure, a gas turbine engine is provided. The gas turbine engine includes a combustion section and a fuel oxygen conversion unit fluidly coupled to the combustion section. The fuel oxygen conversion unit further includes a contactor defining a liquid fuel inlet, a stripping gas inlet and a fuel/gas mixture outlet; and a fuel/gas separator defining a fuel/gas mixture inlet in flow communication with the fuel/gas mixture outlet of the contactor, an axial direction, and a radial direction. The fuel/gas separator further defines a separator assembly including a core including a gas-permeable section extending along the axial direction and defining a maximum diameter, the maximum diameter of the gas-permeable section being substantially constant along the axial direction; and a stationary casing, the fuel/gas separator defining a fuel/gas chamber in fluid communication with the fuel/gas mixture inlet at a location inward of the stationary casing and outward of the gas-permeable section of the separator assembly along the radial direction.

In certain exemplary embodiments the fuel/gas separator defines a liquid fuel outlet in fluid communication with the combustion section of the gas turbine engine.

In certain exemplary embodiments the gas-permeable section defines a volume fraction, and wherein the volume fraction is greater than 20 percent and less than 75 percent.

In certain exemplary embodiments the gas-permeable section defines a volume fraction that varies along the axial direction.

In certain exemplary embodiments the gas-permeable section of the core defines a plurality of labyrinth gas flow paths.

In another exemplary embodiment of the present disclosure, a fuel oxygen conversion unit is provided. The fuel oxygen conversion unit includes a contactor defining a liquid fuel inlet, a stripping gas inlet and a fuel/gas mixture outlet; and a fuel/gas separator defining a fuel/gas mixture inlet in flow communication with the fuel/gas mixture outlet of the contactor, an axial direction, and a radial direction. The fuel/gas separator further includes a stationary casing; and a separator assembly including a core including a gas-permeable section extending along the axial direction, the fuel/gas separator defining a fuel/gas chamber in fluid communication with the fuel/gas mixture inlet at a location inward of the stationary casing and outward of the gas-permeable section of the separator assembly along the radial direction, wherein the gas-permeable section defines a volume fraction greater than 20 percent and less than 75 percent.

In certain exemplary embodiments the gas-permeable section defines a maximum diameter, and wherein the maximum diameter of the gas-permeable section is substantially constant along the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
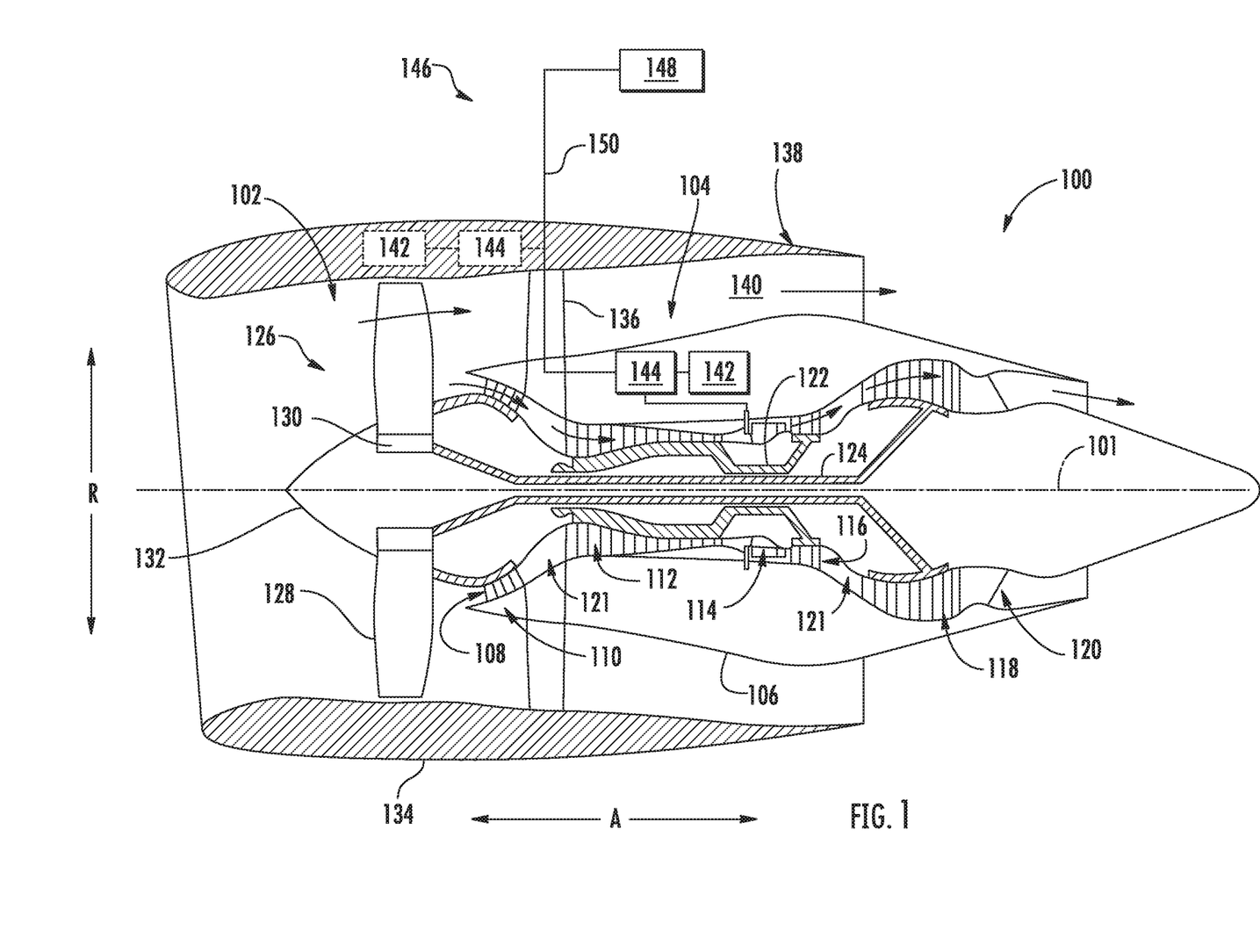
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft or vehicle.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flow path 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen conversion unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen conversion unit 144 is coupled to, or otherwise rotatable with, the accessory gearbox 142. In such a manner, it will be appreciated that the exemplary fuel oxygen conversion unit 144 is driven by the accessory gearbox 142. Notably, as used herein, the term "fuel oxygen conversion unit" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100. A more detailed schematic of a fuel delivery system in accordance with an exemplary embodiment of the present disclosure is provided below with reference to FIG. 2.

Moreover, it will be appreciated that although for the embodiment depicted, the turbofan engine 100 includes the accessory gearbox 142 and fuel oxygen conversion unit 144 positioned within the turbomachine 104, i.e., within the casing 106 of the turbomachine 104, in other embodiments, the accessory gearbox 142 and/or fuel oxygen conversion unit 144 may be positioned at any other suitable location. For example, as is depicted in phantom in FIG. 1, in other embodiments, the accessory gearbox 142 and/or the fuel oxygen conversion unit 144 may be positioned within the nacelle 134 of the turbofan engine 100. Alternatively, in still other embodiments, the accessory gearbox 142 may be positioned with the turbofan engine 100 and the fuel oxygen conversion unit 144 may be positioned remote from the turbofan engine 100, such as proximate to, or within, the tank 148 of the fuel delivery system 146. Additionally, in other embodiments, the fuel oxygen conversion unit 144 may additionally or alternatively be driven by other suitable power sources such as an electric motor, a hydraulic motor, or an independent mechanical coupling to the HP or LP shaft, etc. For example, when the accessory gearbox 142 is driven by an electric motor, the electric motor may be configured to receive electrical power from an electric machine/generator being driven by the engine, such as an LP or HP system of the engine.

Figure 2:
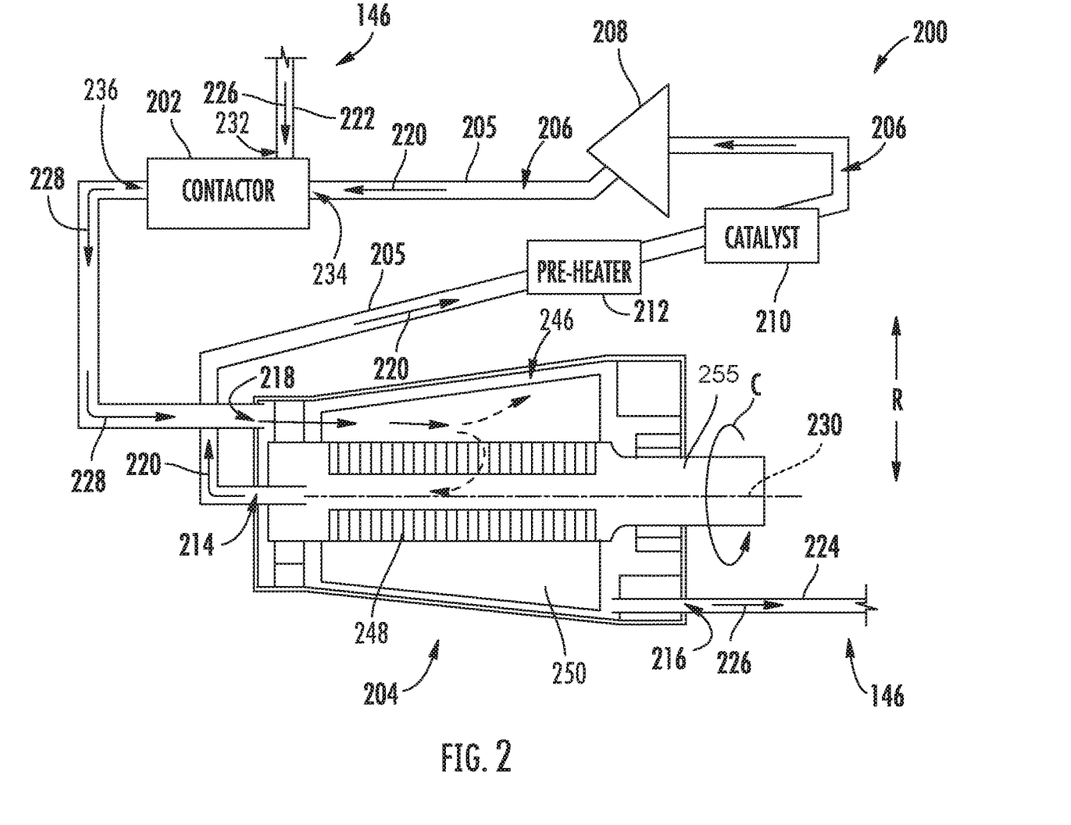
FIG. 2 is a schematic view of a fuel oxygen conversion unit in accordance with an exemplary embodiment of the present disclosure.

Referring now to FIG. 2, a schematic drawing of a fuel oxygen conversion unit 200 for a gas turbine engine in accordance with an exemplary aspect of the present disclosure is provided. In at least certain exemplary embodiments, the exemplary fuel oxygen conversion unit 200 depicted in FIG. 2 may be incorporated into, e.g., the exemplary engine 100 described above with reference to FIG. 1 (e.g., may be the fuel oxygen conversion unit 144 depicted in FIG. 1 and described above).

As will be appreciated from the discussion herein, the fuel oxygen conversion unit 200 of FIG. 2 generally includes a contactor 202 and a fuel/gas separator 204. The exemplary contactor 202 depicted may be configured in any suitable manner to substantially mix a received gas and liquid flow, as will be described below. For example, the contactor 202 may, in certain embodiments be a mechanically driven contactor (e.g., having paddles for mixing the received flows), or alternatively may be a passive contactor for mixing the received flows using, at least in part, a pressure and/or flowrate of the received flows.

Moreover, the exemplary fuel oxygen conversion unit 200 includes a stripping gas line 205, and more particularly, includes a plurality of stripping gas lines 205, which together at least in part define a circulation gas flow path 206 extending from the fuel/gas separator 204 to the contactor 202. In certain exemplary embodiments, the circulation gas flow path 206 may be formed of any combination of one or more conduits, tubes, pipes, etc. in addition to the plurality stripping gas lines 205 and structures or components within the circulation gas flow path 206.

As will be explained in greater detail, below, the fuel oxygen conversion unit 200 generally provides for a flow of stripping gas 220 through the plurality of stripping gas lines 205 and stripping gas flow path 206 during operation. It will be appreciated that the term "stripping gas" is used herein as a term of convenience to refer to a gas generally capable of performing the functions described herein. The stripping gas 220 flowing through the stripping gas flow path/circulation gas flow path 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide ($CO_2$), an inert gas mixture, or some other gas or gas mixture having a relatively low oxygen content.

Moreover, for the exemplary oxygen conversion unit depicted in FIG. 2, the fuel oxygen conversion unit 200 further includes a gas boost pump 208, a gas oxygen reduction unit (which for the embodiment shown is a catalyst 210), and a pre-heater 212. For the embodiment shown, the gas boost pump 208, the catalyst 210, and the pre-heater 212 are each arranged within the circulation gas flow path 206 in series flow. Additionally, the gas boost pump 208 may be configured as a rotary gas pump coupled to, and driven by, a power source (not shown). In certain embodiments, the power source for the gas boost pump 208 may be the same power source for the fuel/gas separator 204 (discussed below), or alternatively, may be any other suitable power source. For example, in certain embodiments, the gas boost pump 208 may be coupled to an accessory gearbox 142 (see FIG. 1), a suitable electrical power source, etc.

Referring still to the embodiment of FIG. 2, it will be appreciated that the fuel/gas separator 204 generally defines a gas outlet 214, a liquid fuel outlet 216, and an inlet 218, and further that the contactor 202 generally defines a liquid fuel inlet 232, a stripping gas inlet 234, and a fuel/gas mixture outlet 236. It will also be appreciated that the exemplary fuel oxygen conversion unit 200 depicted is operable with a fuel delivery system 146, such as a fuel delivery system 146 of the gas turbine engine including the fuel oxygen conversion unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the liquid fuel inlet 232 of the contactor 202 for providing a flow of liquid fuel 226 to the contactor 202 (e.g., from a fuel source, such as a fuel tank) and the outlet fuel line 224 is fluidly connected to the liquid fuel outlet 216 of the fuel/gas separator 204 for receiving a flow of deoxygenated liquid fuel 226 and providing such flow of liquid fuel to, e.g., one or more engines.

Moreover, during typical operations, a flow of stripping gas 220 flows through the circulation gas flow path 206 from the gas outlet 214 of the fuel/gas separator 204 to the stripping gas inlet 234 of the contactor 202. More specifically, during typical operations, stripping gas 220 flows from the gas outlet 214 of the fuel/gas separator 204, through the pre-heater 212 (configured to add heat energy to the gas flowing therethrough), through the catalyst 210, and to/through the gas boost pump 208, wherein a pressure of the stripping gas 220 is increased to provide for the flow of the stripping gas 220 through the circulation gas flow path 206. The relatively high pressure stripping gas 220 (i.e., relative to a pressure upstream of the boost pump 208 and the fuel entering the contactor 202) is then provided to stripping gas inlet 234 of the contactor 202, wherein the stripping gas 220 is mixed with the flow of liquid fuel 226 from the inlet fuel line 222 to generate a fuel/gas mixture 228. The fuel/gas mixture 228 generated within the contactor 202 is provided through the fuel/gas mixture outlet 236 of the contactor 202 to the inlet 218 of the fuel/gas separator 204. Within the fuel/gas separator 204 the fuel/gas mixture 228 may be separated back into the flow of liquid fuel 226 and the flow of stripping gas 220. Such operation of the fuel/gas separator 204 will be described in greater detail below, e.g., with reference to, e.g., FIG. 3.

Generally, it will be appreciated that during operation of the fuel oxygen conversion unit 200, the liquid fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the liquid fuel 226 is mixed with the stripping gas 220, resulting in the fuel/gas mixture 228. As a result of such mixing a physical exchange may occur whereby at least a portion of the oxygen within the fuel 226 is transferred to the stripping gas 220, such that the fuel component of the mixture 228 has a relatively low oxygen content (as compared to the fuel 226 provided through inlet fuel line 222) and the stripping gas component of the mixture 228 has a relatively high oxygen content (as compared to the stripping gas 220 provided through the circulation gas flow path 206 to the contactor 202). The fuel/gas separator 204 separates the relatively high oxygen content stripping gas 220 from the relatively low oxygen content fuel 226, again as will be described in greater detail below with reference to FIG. 3.

Further, it will be appreciated that the liquid fuel 226 provided to the liquid fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 226 provided to the liquid fuel outlet 216 may have an oxygen content of less than about five (5) parts per million ("ppm"), such as less than about three (3) ppm, such as less than about two (2) ppm, such as less than about one (1) ppm, such as less than about 0.5 ppm.

Moreover, as will be appreciated, the exemplary fuel oxygen conversion unit 200 depicted recirculates and reuses the stripping gas 220 (i.e., the stripping gas 220 operates in a substantially closed loop). However, the stripping gas 220 exiting the fuel/gas separator 204, having interacted with the liquid fuel 226, may have a relatively high oxygen content. Accordingly, in order to reuse the stripping gas 220, an oxygen content of the stripping gas 220 from the outlet 214 of the fuel/gas separator 204 may need to be reduced. For the embodiment depicted, and as noted above, the stripping gas 220 flows through the pre-heater 212, through the catalyst 210 where the oxygen content of the stripping gas 220 is reduced, and through the gas boost pump 208. Within the catalyst 210, the relatively oxygen-rich stripping gas 220 is reacted to reduce the oxygen content thereof. It will be appreciated that catalyst 210 may be configured in any suitable manner to perform such functions (i.e., removal of oxygen from the recirculating stripping gas 220). For example, in certain embodiments, the catalyst 210 may be configured to enable the reaction of oxygen and fuel vapor present in the oxygen-rich stripping gas 220 to reduce the overall level of free oxygen in the stripping gas 220. However, in other embodiments, the catalyst 210 may additionally, or alternatively, include geometries of catalytic components through which the relatively oxygen-rich stripping gas 220 flows to reduce an oxygen content thereof. In one or more of these configurations, a byproduct may be produced, such as water, which may be ducted away from the catalyst 210 (duct not depicted in the embodiment of FIG. 2).

Notably, however, in other embodiments any other suitable gas oxygen reduction unit may be provided for reducing an oxygen content of the stripping gas 220. For example, in addition to, or in the alternative, the gas oxygen reduction unit may utilize a membrane oxygen reduction system, a combustion reduction system, a plasma reduction system, etc.

In one or more of these embodiments, the gas oxygen reduction unit/catalyst 210 may be configured to reduce an oxygen content of the stripping gas 220 to less than about five percent (5%) oxygen ($O_2$) by mass, such less than about two percent (2%) oxygen ($O_2$) by mass, such less than about one percent (1%) oxygen ($O_2$) by mass.

The resulting relatively low oxygen content gas is then provided through the remainder of the circulation gas flow path 206 and back to the contactor 202, such that the cycle may be repeated. In such a manner, it will be appreciated that the stripping gas 220 may be any suitable gas capable of undergoing the chemical transitions described above. For example, the stripping gas may be deoxygenated air from, e.g., a core air flow path of a gas turbine engine including the fuel oxygen conversion unit 200 (e.g., compressed air bled from an HP compressor 112; see FIG. 1). However, in other embodiments, the stripping gas may instead be any other suitable gas, such as an inert gas, such as Nitrogen or Carbon Dioxide ($CO_2$), an inert gas mixture, or some other gas or gas mixture having a relatively low oxygen content.

It will be appreciated, however, that the exemplary fuel oxygen conversion unit 200 described above is provided by way of example only. In other embodiments, the fuel oxygen conversion unit 200 may be configured in any other suitable manner. For example, in other embodiments, the stripping gas 220 may not flow through a circulation gas flow path 206, and instead the fuel oxygen conversion unit 200 may include an open loop stripping gas flow path, with such flow path in flow communication with a suitable stripping gas source, such as a bleed air source, and configured to dump such air, e.g., to the atmosphere downstream of the fuel/gas separator 204.

Figure 3:
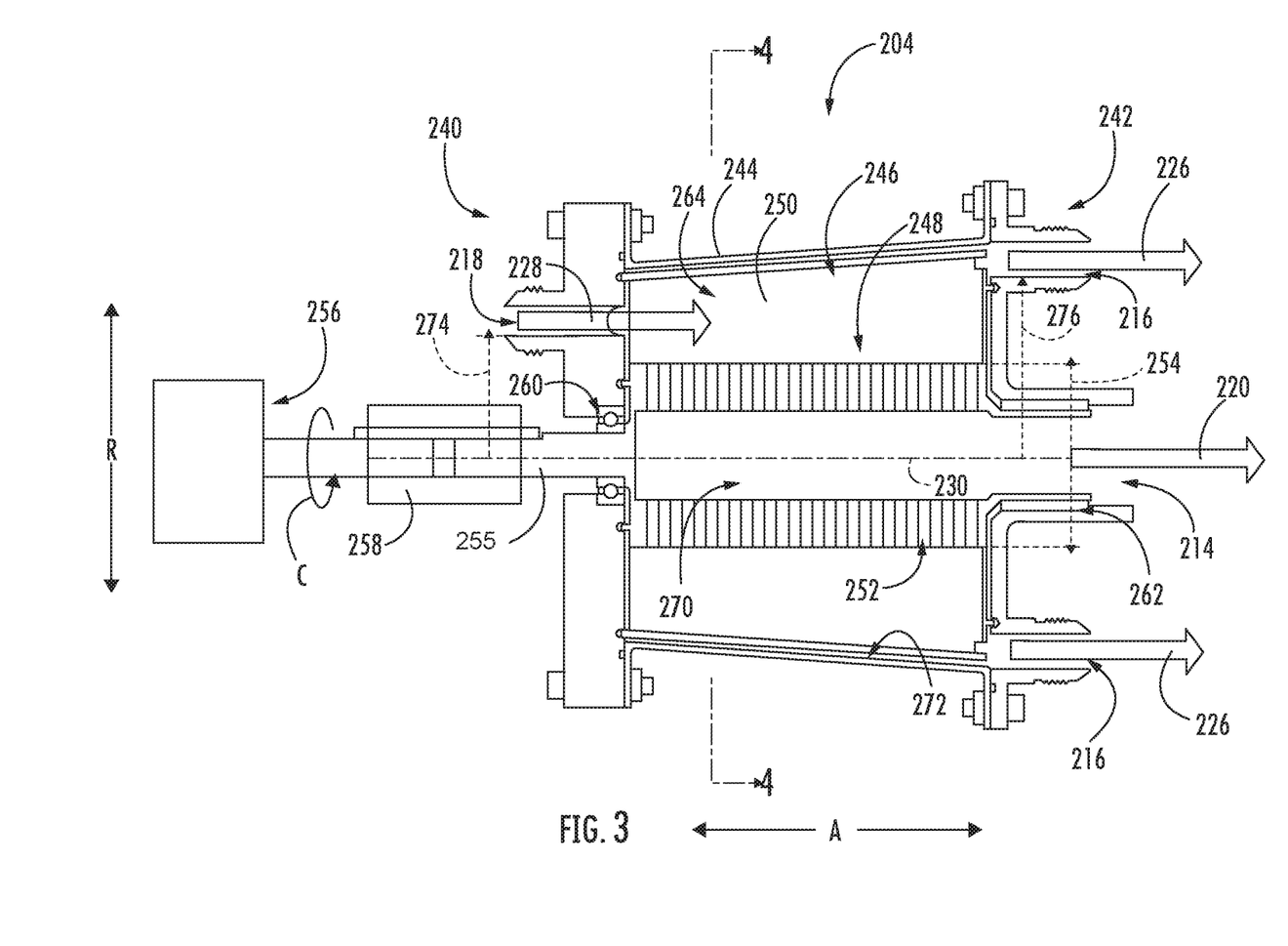
FIG. 3 is a close-up, schematic, cross-sectional view of a fuel/gas separator in accordance with an exemplary embodiment of the present disclosure.

Referring now to FIG. 3, operation of a fuel/gas separator 204 in accordance with an exemplary embodiment of the present disclosure is described. In at least certain exemplary embodiments, the exemplary fuel/gas separator 204 of FIG. 3 may be configured in a similar manner to the exemplary fuel/gas separator 204 described above with reference to FIG. 2, and accordingly, may be incorporated into a fuel oxygen conversion unit 200 (and fuel delivery system) similar to the exemplary fuel oxygen conversion unit 200 (and fuel delivery system) described above with reference to FIGS. 1 and 2.

For example, the exemplary fuel/gas separator 204 generally defines a fuel/gas mixture inlet 218 (which may be in flow communication with a fuel/gas mixture outlet of a contactor 202), a liquid fuel outlet 216 (or rather, a plurality of liquid fuel outlets 216), and a gas outlet 214. Further, the fuel/gas separator 204 defines an axial direction A, and a first end 240 and a second end 242 along the axial direction A. The fuel/gas mixture inlet 218 is positioned at the first end 240 and the liquid fuel outlet 216 is positioned at the second end 242. However, by contrast to the embodiment of FIG. 2, the gas outlet 214 is also positioned at the second end 242—although, in other embodiments the gas outlet 214 may be positioned at any other suitable location.

Additionally, for the embodiment shown, the fuel/gas separator 204 further defines a central axis 230 (extending along the axial direction A), a radial direction R, and a circumferential direction C extending about the axial direction A/central axis 230.

Referring still to the embodiment of FIG. 3, the fuel/gas separator 204 includes a stationary casing 244 and a separator assembly 246. The separator assembly 246 includes a core 248 and, for the embodiment shown, a plurality of paddles 250 coupled to the core 248 and extending outwardly generally along the radial direction R. Further, it will be appreciated that the core 248 includes a gas-permeable section 252 extending along the axial direction A. The gas-permeable section 252 of the core 248 defines a maximum diameter 254 along the radial direction R. For the embodiment shown, the maximum diameter 254 of the gas-permeable section 252 is substantially constant along the axial direction A, and more particularly, along an entire length of the gas-permeable section 252 (i.e., length 280, see FIG. 5) along the axial direction A. More specifically, for the embodiment shown, the gas-permeable section 252 of the core 248 defines a substantially cylindrical shape along the axial direction A, and more specifically, a substantially cylindrical shape along an entire length of the gas-permeable section 252 along the axial direction A (see, also, FIG. 4, discussed below). The gas-permeable section 252 will be described in greater detail below.

Further, it will be appreciated that the exemplary fuel/gas separator 204 depicted is a mechanically driven fuel/gas separator 204, or more specifically is a rotary/centrifugal fuel/gas separator 204. Accordingly, for the embodiment depicted the separator assembly 246 includes an input shaft 255 formed integrally with, or coupled to, the core 248. Briefly, it will be appreciated that for the embodiment shown, the input shaft 255 is coupled to a power source 256 through a coupling 258, such that the power source 256 may rotate the input shaft 255 and core 248 in the circumferential direction C, i.e., about the axial direction A. In such a manner, it will be appreciated that the separator assembly 246 of the fuel/gas separator 204 is rotatable about the axial direction A relative to the stationary casing 244. As such, the exemplary fuel/gas separator 204 depicted further includes a first set and a second set of bearings 260, 262 at the first and second ends 240, 242, respectively, for rotatably mounting the core 248 within the stationary housing 244.

Additionally, the fuel/gas separator 204 defines a fuel/gas chamber 264 at a location inward of the stationary casing 244 and outward of the gas-permeable section 252 of the separator assembly 246 along the radial direction R. The fuel/gas chamber 264 is in fluid communication with the fuel/gas mixture inlet 218 of the fuel/gas separator 204. More specifically, for the embodiment shown, the fuel/gas mixture inlet 218 is configured to provide substantially all of a fuel/gas mixture 228 received therethrough (i.e., from the fuel/gas mixture outlet of the contactor 202) to the fuel/gas chamber 264. As will be appreciated, rotation of the plurality of paddles 250 within the fuel/gas chamber 264 may generate the centrifugal forces for separating the liquid fuel component of the fuel/gas mixture 228 from the stripping gas component of the fuel/gas mixture 228.

Figure 4:
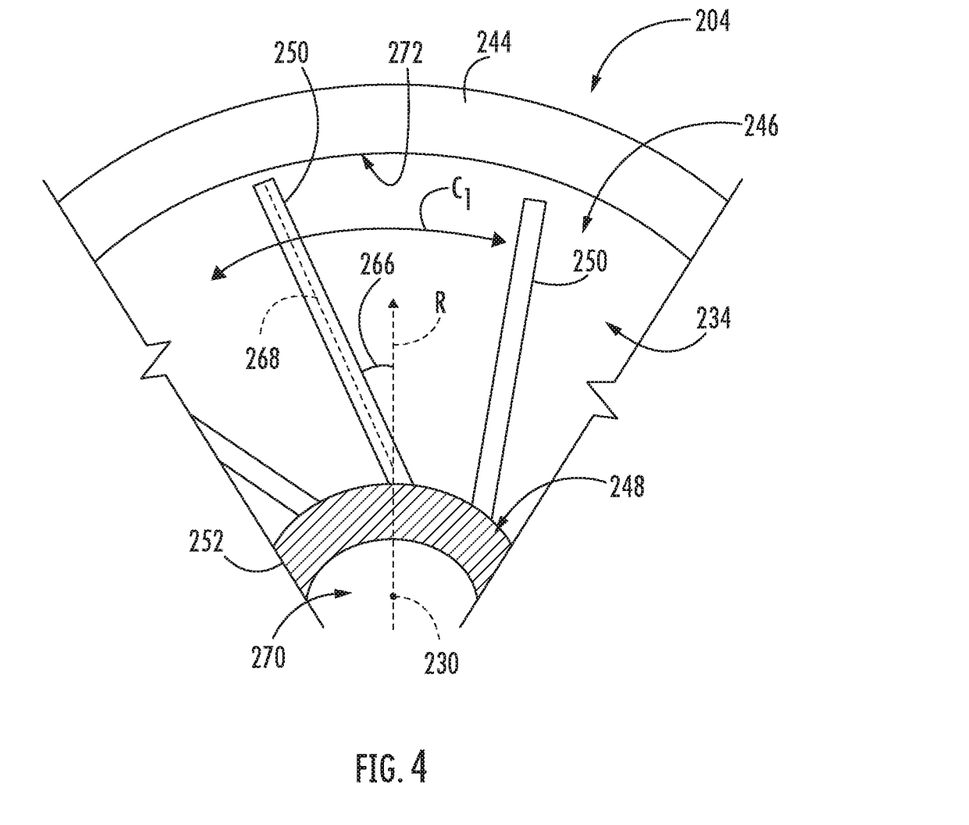
FIG. 4 is an axial, cross-sectional view of the exemplary fuel/gas separator of FIG. 3.

Referring briefly to FIG. 4, a cross-sectional view of the fuel/gas separator 204 of FIG. 3, along Line 4-4 of FIG. 3, is provided. As noted above, the plurality of paddles 250 extend outward from the core 248 generally along the radial direction R. Further, the plurality of paddles 250 are spaced apart from one another generally along the circumferential direction C. Notably, it will be appreciated that for the embodiment of FIG. 4, the plurality of paddles 250 do not extend exactly along the radial direction R. Instead, the plurality of paddles 250 define a sweep angle 266 relative to the radial direction R. During operation of the fuel/gas separator 204, as discussed, the separator assembly 246 is configured to rotate about the central axis 230 in a first circumferential direction C1. For the embodiment shown, each of the plurality of paddles 250, while extending in a substantially linear direction, slopes away from the core 248 generally along the radial direction R and in a direction opposite the first circumferential direction C1, therefore defining the sweep angle 266.

More specifically, for the embodiment depicted, the sweep angle 266 of the plurality of paddles 250 refers to an angle of a reference line 268 extending between a circumferential midpoint of the paddle 250 at its base and a circumferential midpoint of the paddle 250 at its tip. Further, as will be appreciated for the embodiment of FIG. 4, the sweep angle 266 is greater than zero (0). More specifically, for the embodiment shown, the sweep angle 266 is greater than about ten (10) degrees and less than about forty-five (45) degrees, such as greater than about fifteen (15) degrees and less than about thirty (30) degrees. However, in other embodiments any other suitable sweep angle 266 may be provided. For example, in other embodiments, the sweep angle 266 may be equal to 0. Alternatively, in other embodiments, the paddles 250 may define a "negative" sweep angle 266, such that the plurality of paddles 250 extend in the same circumferential direction C in which the separator assembly 246 rotates (i.e., the first circumferential direction C1 for the embodiment of FIG. 4). Additionally, although for the embodiment depicted, the plurality of paddles 250 extend linearly, in other embodiments, one or more the plurality of paddles 250 may define a bend, a bow, or other suitable shape.

Referring back to FIG. 3, as briefly mentioned above, during operation of the fuel/gas separator 204, the core 248 and the plurality of paddles 250 of the separator assembly 246 may rotate about the axial direction A to urge a relatively heavy liquid fuel 226 component of the fuel/gas mixture 228 outward along the radial direction R relative to the relatively light stripping gas 220 component of the fuel/gas mixture 228. The core 248 of the separator assembly 246 further defines a gas passage 270 extending inward of the gas-permeable section 252 of the core 248 along the axial direction A. More specifically, for the embodiment shown, the gas passage 270 defined by the core 248 extends along the axial direction A to the gas outlet 214. In such a manner, gas 220 separated from the fuel/gas mixture 228 may flow through the gas-permeable section 252 of the core 248, to and through the gas passage 270 to the gas outlet 214.

Additionally, the stationary casing 244 of the fuel/gas separator 204 is configured to assist with the separation of the liquid fuel 226 from the stripping gas 220 within the fuel/gas mixture 228. More specifically, the stationary casing 244 includes an inner surface 272. The inner surface 272 of the stationary casing 244 defines at least in part the fuel/gas chamber 264 of the fuel/gas separator 204. For the embodiment shown, the inner surface 272 of the stationary casing 244 diverges from the axis 230 towards the second end 242 of the fuel/gas separator 204. Further, it will be appreciated that the liquid fuel outlet 216 of the fuel/gas separator 204 is positioned farther outward along the radial direction R than the fuel/gas mixture inlet 218. For example, the fuel/gas mixture inlet 218 depicted in FIG. 3 defines a first radius 274 relative to the axis 230 and the liquid fuel outlet 216 defines a second radius 276 relative to the axis 230. The second radius 276 is larger than the first radius 274, such as ten percent larger, such as twenty percent larger, such as twenty-five percent larger, such as up to an infinite percent larger (e.g., for embodiments wherein the fuel/gas mixture 228 is provided to the fuel/gas separator 204 along the axis 230).

Figure 5:
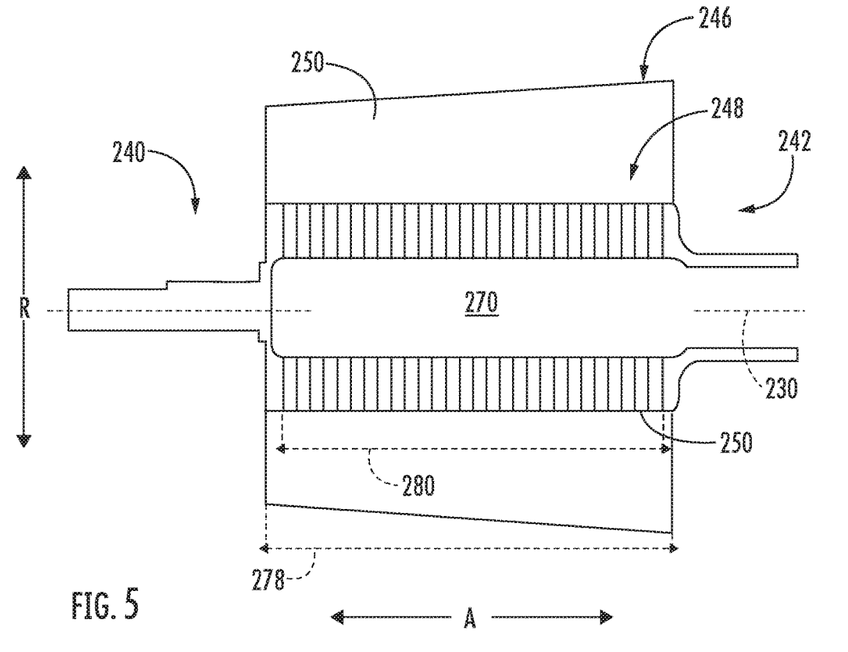
FIG. 5 is a schematic, cross-sectional view of a separator assembly of a fuel/gas separator in accordance with an exemplary embodiment of the present disclosure.

Referring now to FIG. 5, an isolated, cross-sectional view of the separator assembly 246 of the exemplary fuel/gas separator 204 of FIG. 3 is depicted. For the exemplary embodiment of FIG. 5, the gas-permeable section 252 of the core 248 of the separator assembly 246 is configured to extend substantially through the entirety of the fuel/gas chamber 264 of the fuel/gas separator 204 when installed. More specifically, for the embodiment shown, it will be appreciated that each of the plurality of paddles 250 defines a length 278 along the axial direction A, and similarly, the gas-permeable section 252 of the core 248 defines a length 280 along the axial direction A. For the embodiment shown, the length 280 of the gas-permeable section 252 of the core 248 is substantially equal to the length 278 of the plurality of paddles 250. In such a manner, the core 248 may facilitate a desired amount of gas flow through the gas-permeable section 252 and to the gas passage 270 defined by the core 248.

In order to further facilitate a desired amount of gas flow through the gas-permeable section 252, it will be appreciated that the gas-permeable section 252 defines a volume fraction. The volume fraction of the gas-permeable section 252 refers to a percentage of the gas-permeable section 252 that is solid mass (i.e., between an inner and outer diameter and along the length 280). For example, a one hundred percent volume fraction refers to a completely solid material, whereas a zero percent volume fraction refers to a completely open space. For the embodiment shown, the gas-permeable section 252 of the core 248 defines a volume fraction greater than twenty percent (20%) and less than seventy-five percent (75%). Additionally, for the embodiment shown, the volume fraction of the gas-permeable section 252 of the core 248 is substantially constant along the length 280 of the gas-permeable section 252 and along the axial direction A.

Notably, in other exemplary embodiments, the gas-permeable section 252 may define other suitable volume fractions. For example, in one embodiment, a length of the gas-permeable section 252 (or all of the gas permeable section 252) may define a volume fraction less than twenty percent (20%), such as less than ten percent (10%), such as less than five percent (5%). Alternatively, in still other embodiments, a length of the gas-permeable section 252 (or all of the gas permeable section 252) may define a volume fraction greater than seventy-five percent (75%).

Figure 6:
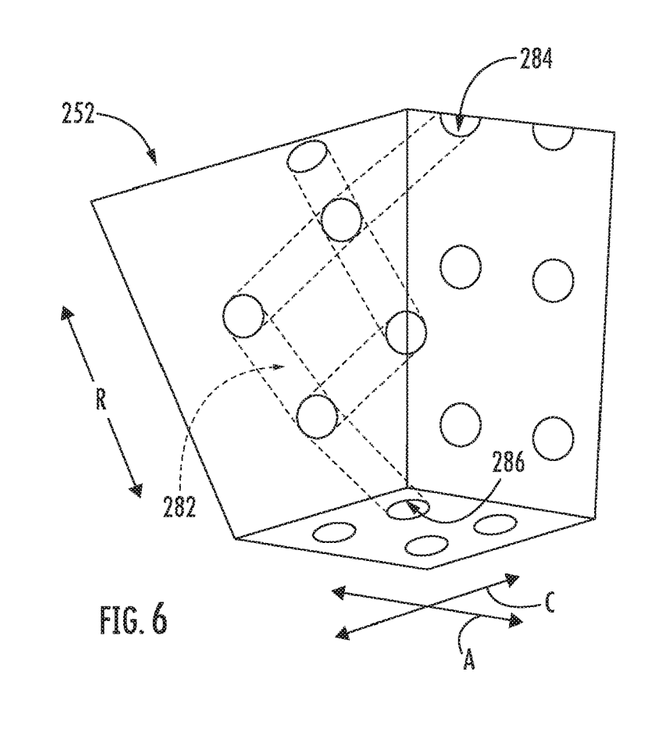
FIG. 6 is a perspective, sectional view of a portion of a gas-permeable section of a core of the exemplary separator assembly of FIG. 5.

Further, referring now also to FIG. 6, providing a perspective view of a section of the gas-permeable section 252 of the core 248 of FIG. 5, it will be appreciated that gas-permeable section 252 defines a plurality of gas flow paths. For the embodiment shown, the plurality of gas flow paths defined by the gas-permeable section 252 are a plurality of labyrinth gas flow paths 282 (only a few depicted in phantom for clarity). As used herein, the term "labyrinth gas flow path" refers to a flow path extending between one or more inlets (inlets 284) and one or more outlets (outlets 286) wherein there is no line of sight between the one or more inlets (inlets 284) and one or more outlets (outlets 286). In such a manner, it will be appreciated that during operation of the fuel/gas separator 204, any liquid fuel 226 component of the fuel/gas mixture 228 flowing into the gas-permeable section 252 may impinge on a solid portion of the gas-permeable section 252 and coalesce to form a heavier droplet of liquid fuel 226. The circumferential rotation of the separator assembly 246 (including the core 248 and gas-permeable section 252 of core 248) may centrifuge the heavier droplets of liquid fuel 226 outwardly along the radial direction R, preventing such liquid fuel 226 from flowing through the gas-permeable section 252 and into the gas passage 270 defined by the core 248.

Notably, in at least certain exemplary embodiments, the gas-permeable section 252 of the core 248 may be formed through an additive manufacturing process. Such may enable the inclusion of labyrinth gas flow paths 282. As used herein, the term "additive manufacturing process" refers generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes. Suitable additive manufacturing processes in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes. The additive manufacturing processes described herein may be used for forming components using any suitable material (e.g., plastic, metal, concrete, ceramic, polymer, epoxy, photopolymer resin, or any other suitable material that may be in solid, liquid, powder, sheet material, wire, or any other suitable form or combinations thereof).

It will be appreciated, however, that in other exemplary embodiments, the separator assembly 246, including the gas-permeable section 252 of the core 248 of the separator assembly 246, may be formed in any other suitable manner, and may have any other suitable configuration. For example, referring now generally to FIGS. 7 through 9, various alternative embodiments of the separator assembly 246 of the fuel/gas separator 204 of the present disclosure are depicted. In each of these Figs., the separator assembly 246 may be configured in substantially the same manner as the exemplary separator assembly 246 described above with reference to FIG. 5, and accordingly may be incorporated into a fuel/gas separator 204 in accordance with one or more embodiments the present disclosure, such as the fuel/gas separator 204 of FIG. 3.

Figure 7:
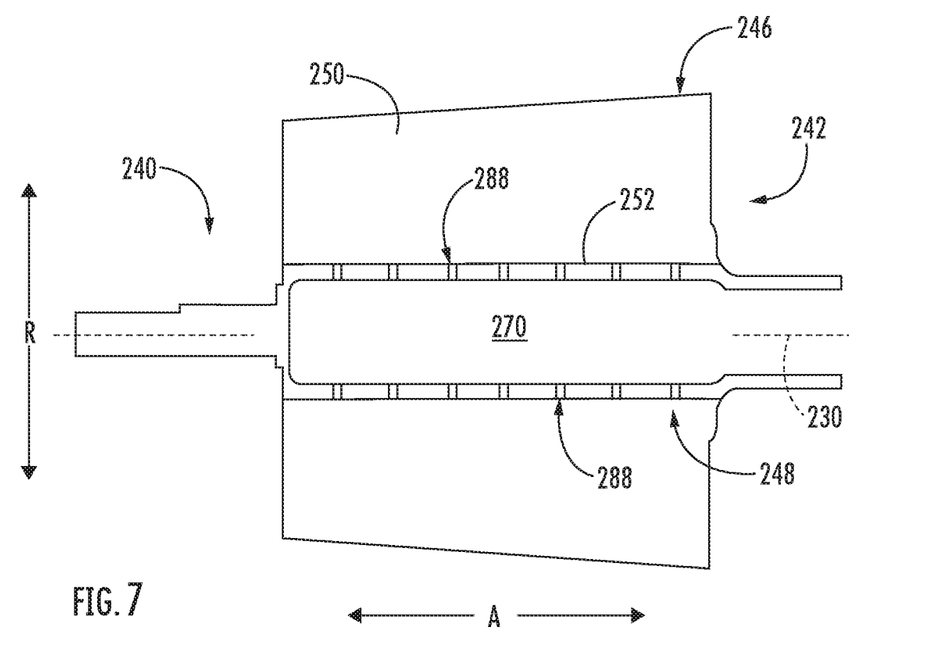
FIG. 7 is a schematic, cross-sectional view of a separator assembly of a fuel/gas separator in accordance with another exemplary embodiment of the present disclosure.
Figure 8:
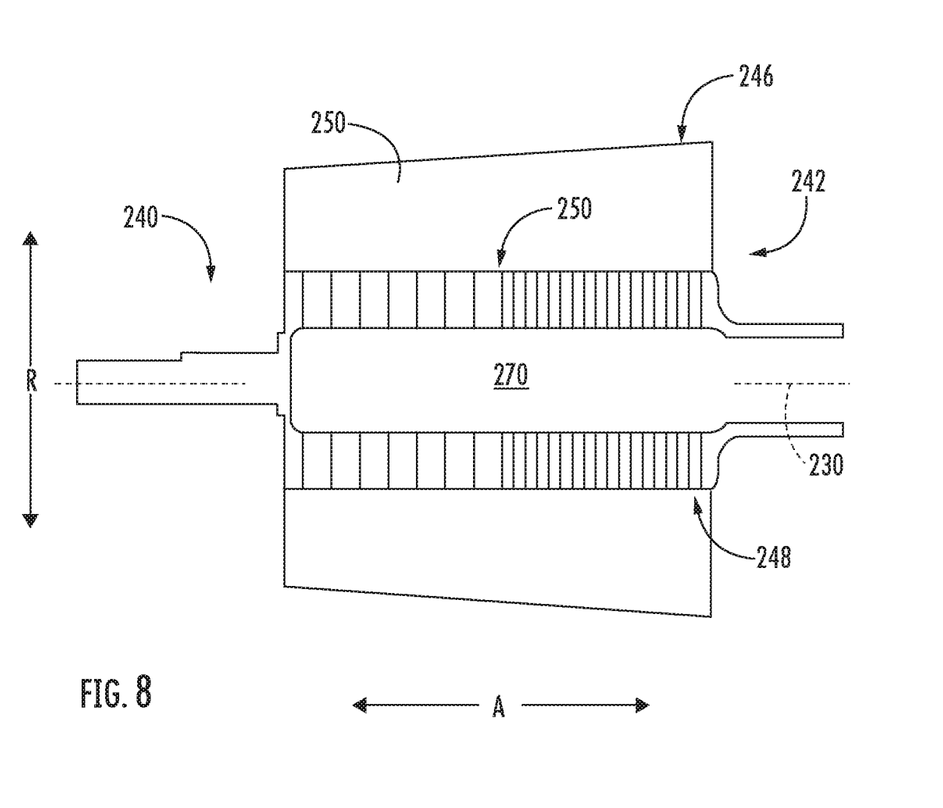
FIG. 8 is a schematic, cross-sectional view of a separator assembly of a fuel/gas separator in accordance with yet another exemplary embodiment of the present disclosure.
Figure 9:
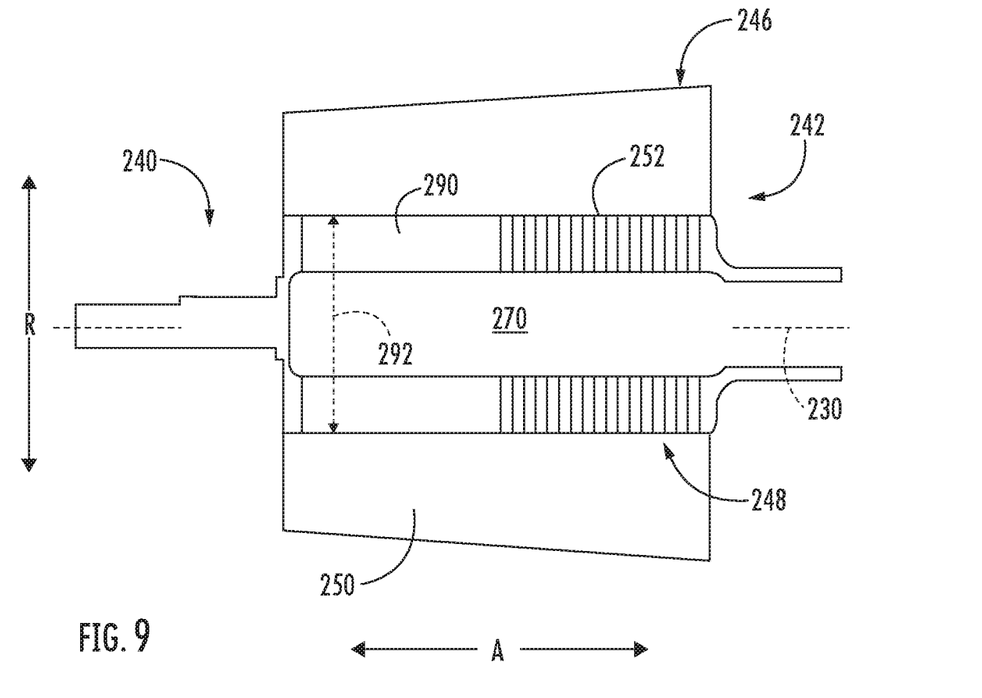
FIG. 9 is a schematic, cross-sectional view of a separator assembly of a fuel/gas separator in accordance with still another exemplary embodiment of the present disclosure.

For example, each exemplary separator assembly 246 depicted in FIGS. 7 through 9 generally includes a core 248 and a plurality of paddles 250 coupled to the core 248 and extending generally along a radial direction R of the fuel/gas separator 204. Further, the core 248 generally includes a gas-permeable section 252 extending along an axial direction A of the fuel/gas separator 204.

Referring first particularly to the embodiment of FIG. 7, it will be appreciated that for the embodiment shown, the gas-permeable section 252 of the core 248 is generally configured as a cylindrical member defining a plurality of holes or perforations 288. For the embodiment shown, the plurality of perforations 288 are spaced substantially equally along the axial direction A of the fuel/gas separator 204. In such a manner, it will be appreciated that the gas-permeable section 252 of the core 248 of the embodiment of FIG. 7 defines a volume fraction that is substantially constant along the length of the gas-permeable section 252 and along the axial direction A. The exemplary gas-permeable section 252 of FIG. 7 may be formed in any suitable manner, such as through an additive manufacturing process, or alternatively, through other formation methods (including drilling the perforations 288 into a previously formed cylindrical member).

Referring next particularly to the embodiment of FIG. 8, it will be appreciated that for the embodiment shown, the gas-permeable section 252 of the core 248 defines a volume fraction that varies along the axial direction A of the fuel/gas separator 204. More specifically, for the embodiment shown, the fuel/gas separator 204 defines a volume fraction that decreases along the axial direction A. For example, when integrated into the exemplary fuel/gas separator 204 of FIG. 3, which defines a first end 240 and a second end 242 along the axial direction A, with the fuel/gas mixture inlet 218 positioned at the first end 240, the volume fraction of the gas-permeable section 252 of the core 248 decreases towards the second end 242 of the fuel/gas separator 204. In such a manner, the gas-permeable section 252 "opens up"/ becomes less dense towards the second end 242, away from the fuel/gas mixture inlet 218. Notably, the exemplary gas-permeable section 252 of FIG. 8 may be formed in any suitable manner, such as through an additive manufacturing process, or alternatively, through other formation methods. For example, the gas-permeable section 252 of FIG. 8 may be configured in a similar manner to the gas-permeable section 252 described above with reference to FIG. 6 (except with a varying volume fraction along the axial direction A).

Further, referring now particularly to the embodiment of FIG. 9, it will be appreciated that for the embodiment shown, the core 248 of the separator assembly 246 further includes a gas-impermeable section 290. The gas-impermeable section 290 also extends along the axial direction A, defines a maximum diameter 292 that is substantially constant along the axial direction A, and defines a substantially cylindrical shape. For the embodiment shown, the gas-impermeable section 290 is generally configured as a solid cylindrical member. The gas-impermeable section 290 is positioned adjacent to the gas-permeable section 252 along the axial direction A. Additionally, similar to the embodiment described above with reference to FIG. 8, when integrated into the exemplary fuel/gas separator 204 of FIG. 3, which defines a first end 240 and a second end 242 along the axial direction A, with the fuel/gas mixture inlet 218 positioned at the first end 240, the gas-impermeable section 290 is positioned adjacent to the gas-permeable section 252 along the axial direction A and closer to the first end 240 of the fuel/gas separator 204 than the gas-permeable section 252.

Such configurations may allow for an initial amount of centrifuging to occur within the fuel/gas chamber 264 of the fuel/gas separator 204 prior to opening up passages to the internal gas passage 270 defined by the core 248 for the stripping gas 220.

It will be appreciated, however, that the exemplary separator assemblies 246 and their respective cores 248 and gas-permeable sections 252 depicted, are provided by way of example only. In other embodiments, any other suitable configuration may be included. For example, in other embodiments, the paddles 250 may be fixed to a rotating component in any other suitable manner, the core 248, or the gas-permeable section 252 of the core 248, may extend in any other suitable manner, etc. Additionally, in other exemplary embodiments, the volume fraction of the gas-permeable section 252 of the core 248 may increase along the axial direction A towards the second end 242 (from the first end 240).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel oxygen conversion unit comprising:
   a contactor defining a liquid fuel inlet, a stripping gas inlet and a fuel/gas mixture outlet; and
   a fuel/gas separator defining a fuel/gas mixture inlet in flow communication with the fuel/gas mixture outlet of the contactor, an axial direction, a radial direction, and a central axis of the fuel/gas separator extending in the axial direction,
   wherein the fuel/gas separator comprises:
      a separator assembly including a core comprising a gas-permeable section extending along the axial direction and defining a maximum diameter, the maximum diameter of the gas-permeable section being substantially constant along the axial direction; and
      a stationary casing,
   wherein the fuel/gas separator defines a fuel/gas chamber in fluid communication with the fuel/gas mixture inlet at a location inward of the stationary casing and outward of the gas-permeable section of the separator assembly along the radial direction,
   wherein the maximum diameter is defined as a distance between a topmost portion of the gas-permeable section in the radial direction to a bottommost portion of the gas-permeable section of the gas-permeable section in the radial direction,
   wherein the topmost portion of the gas-permeable section is on a top side of the central axis, and the bottommost portion of the gas-permeable section of the gas-permeable section is on a bottom side of the central axis,
   wherein the gas-permeable section of the core defines a plurality of gas flow paths, and
   wherein the separator assembly of fuel/gas separator further comprises a plurality of paddles coupled to the core and extending outwardly generally along the radial direction.

2. The fuel oxygen conversion unit of claim 1, wherein the gas-permeable section defines a volume fraction, and wherein the volume fraction is greater than 20 percent and less than 75 percent.

3. The fuel oxygen conversion unit of claim 1, wherein the gas-permeable section defines a volume fraction that varies along the axial direction.

4. The fuel oxygen conversion unit of claim 3, wherein the fuel/gas separator defines a first end and a second end along the axial direction, wherein the fuel/gas mixture inlet is positioned at the first end, and wherein the volume fraction of the gas-permeable section decreases towards the second end of the fuel/gas separator.

5. The fuel oxygen conversion unit of claim 1, wherein the gas-permeable section of the core defines a plurality of labyrinth gas flow paths.

6. The fuel oxygen conversion unit of claim 5, wherein the gas-permeable section of the core is formed through an additive manufacturing process.

7. The fuel oxygen conversion unit of claim 1, wherein the fuel/gas separator defines a first end and a second end along the axial direction, wherein the fuel/gas mixture inlet is positioned at the first end, wherein the core further comprises a gas-impermeable section extending along the axial direction, wherein the gas-impermeable section is positioned adjacent to the gas-permeable section along the axial direction and closer to the first end of the fuel/gas separator than the gas-permeable section.

8. The fuel oxygen conversion unit of claim 1, wherein the gas-permeable section of the core defines a substantially cylindrical shape along the axial direction.

9. The fuel oxygen conversion unit of claim 1, wherein the fuel/gas mixture inlet is configured to provide substantially all of a fuel/gas mixture received therethrough to the fuel/gas chamber.

10. The fuel oxygen conversion unit of claim 1, wherein the plurality of paddles each define a length along the axial direction, wherein the gas-permeable section of the core defines a length along the axial direction, and wherein the length of the gas-permeable section of the core is substantially equal to the length of each of the plurality of paddles.

11. The fuel oxygen conversion unit of claim 1, wherein the separator assembly is rotatable about the axial direction of the fuel/gas separator relative to the stationary casing.

12. The fuel oxygen conversion unit of claim 1, wherein the fuel/gas separator defines a gas outlet, and wherein the core defines a gas passage extending inward of the gas-permeable section of the core along the axial direction to the gas outlet.

13. A gas turbine engine comprising: a combustion section; and a fuel oxygen conversion unit fluidly coupled to the combustion section, the fuel oxygen conversion unit comprising: a contactor defining a liquid fuel inlet, a stripping gas inlet and a fuel/gas mixture outlet; and a fuel/gas separator defining a fuel/gas mixture inlet in flow communication with the fuel/gas mixture outlet of the contactor, an axial direction, a radial direction, and a central axis of the fuel/gas separator extending in the axial direction, wherein the fuel/gas separator comprises: a separator assembly including a core comprising a gas-permeable section extending along the axial direction and defining a maximum diameter, the maximum diameter of the gas-permeable section being substantially constant along the axial direction; and a stationary casing, the fuel/gas separator defining a fuel/gas chamber in fluid communication with the fuel/gas mixture inlet at a location inward of the stationary casing and outward of the gas-permeable section of the separator assembly along the radial direction, wherein the maximum diameter is defined as a distance between a topmost portion of the gas-permeable section in the radial direction to a bottommost portion of the gas-permeable section in the radial direction, and wherein the topmost portion of the gas-permeable section is on a top side of the central axis, and the bottommost portion of the gas-permeable section is on a bottom side of the central axis,     wherein the gas-permeable section of the core defines a plurality of gas flow paths, and wherein the separator assembly of fuel/gas separator further comprises a plurality of paddles coupled to the core and extending outwardly generally along the radial direction.

14. The gas turbine engine of claim 13, wherein the fuel/gas separator defines a liquid fuel outlet in fluid communication with the combustion section of the gas turbine engine.

15. The gas turbine engine of claim 13, wherein the gas-permeable section defines a volume fraction, and wherein the volume fraction is greater than 20 percent and less than 75 percent.

16. The gas turbine engine of claim 13, wherein the gas-permeable section defines a volume fraction that varies along the axial direction.

17. The gas turbine engine of claim 13, wherein the gas-permeable section of the core defines a plurality of labyrinth gas flow paths.

18. A fuel oxygen conversion unit comprising:

a contactor defining a liquid fuel inlet, a stripping gas inlet and a fuel/gas mixture outlet; and a fuel/gas separator defining a fuel/gas mixture inlet in flow communication with the fuel/gas mixture outlet of the contactor, an axial direction, and a radial direction, wherein the fuel/gas separator comprises:
    a stationary casing; and
    a separator assembly including a core comprising a gas-permeable section extending along the axial direction, wherein the fuel/gas separator defines a fuel/gas chamber in fluid communication with the fuel/gas mixture inlet at a location inward of the stationary casing and outward of the gas-permeable section of the separator assembly along the radial direction, wherein the gas-permeable section defines a volume fraction greater than 20 percent and less than 75 percent, wherein the gas-permeable section defines a maximum diameter, and wherein the maximum diameter of the gas-permeable section is substantially constant along the axial direction, wherein the gas-permeable section of the core defines a plurality of gas flow paths, and wherein the separator assembly of fuel/gas separator further comprises a plurality of paddles coupled to the core and extending outwardly generally along the radial direction.

* * * * *